(12) United States Patent
Bowman et al.

(10) Patent No.: US 8,082,770 B2
(45) Date of Patent: Dec. 27, 2011

(54) APPARATUS AND METHOD FOR FORMING WIRE LOOPS FOR A DYNAMOELECTRIC MACHINE

(75) Inventors: Daniel J. Bowman, Greenfield, IN (US); David M. Kroll, Pendleton, IN (US); Sang-Soo Choi, Indianapolis, IN (US); Richard A. Vansickle, Noblesville, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 859 days.

(21) Appl. No.: 12/052,932

(22) Filed: Mar. 21, 2008

(65) Prior Publication Data

US 2009/0236005 A1 Sep. 24, 2009

(51) Int. Cl.
*B21D 13/02* (2006.01)
(52) U.S. Cl. .................. 72/385; 140/92.1; 72/379.6
(58) Field of Classification Search .............. 72/380, 72/381, 383–385, 379.6, 412, 414, 416, 405.01, 72/472, 470, 474, 475; 140/105, 106
See application file for complete search history.

(56) References Cited

U.S. PATENT DOCUMENTS

| | | | | |
|---|---|---|---|---|
| 2,419,724 A * | 4/1947 | Millard et al. | ................... | 72/373 |
| 4,745,675 A * | 5/1988 | Marks et al. | ..................... | 29/596 |
| 7,024,907 B2 * | 4/2006 | Beauvois et al. | ................ | 72/385 |
| 7,178,374 B2 * | 2/2007 | Enjoji et al. | ...................... | 72/312 |
| 2004/0261256 A1 | 12/2004 | Sadiku | | |
| 2007/0277899 A1 * | 12/2007 | Neet et al. | ...................... | 140/105 |

\* cited by examiner

*Primary Examiner* — Dana Ross
*Assistant Examiner* — Matthew G Katcoff
(74) *Attorney, Agent, or Firm* — Cantor Colburn LLP

(57) ABSTRACT

An apparatus and method for forming at least one end turn and at least one stator slot segment of a conductor for a stator of a dynamoelectric machine comprising at least two forming die sets. The forming die sets are disposed having a space substantially equal to a width of the conductor between adjacent die sets and include a female forming die and a male forming die linearly slideable to the female forming die. The die sets are disposed such that both at least one end turn and at least one stator slot segment are formable between the male forming dies and the female forming dies when the male forming dies are sequentially actuated to the female forming dies.

12 Claims, 4 Drawing Sheets

US 8,082,770 B2

APPARATUS AND METHOD FOR FORMING WIRE LOOPS FOR A DYNAMOELECTRIC MACHINE

BACKGROUND OF THE INVENTION

The present invention relates generally to dynamoelectric machines. More specifically, this invention relates to an apparatus and method for forming a stator winding for a dynamoelectric machine into a desired shape.

A dynamoelectric machine, such as an electric motor, an electric generator, or a vehicle alternator, contains, among other things, a stationary component known as a "stator," and a rotating component known as a "rotor." In the most common embodiment, the perimeter of the rotor and an inside configuration of the stator are cylindrical in shape. It is known in the art that a stator and a rotor each may be manufactured from a core made from a magnetic material, around which or within which insulated electrical conductors known as "windings" or "coils" are installed.

A typical stator of a design known in the art comprises a hollow, cylindrical core, the inner surface of which contains slots, which extend the full length of the core parallel to the axial direction of the core. The portions of the stator core between the slots are known as the "teeth." These teeth extend radially inward toward the center of the core.

Stator windings, commonly formed from insulated conductors of, for example, copper, comprise slot sections and end turns, with the slot sections being disposed in the stator slots and the end turns traversing a distance between sequential slot sections. Multiple layers of slot sections are disposed in each stator slot until a desired stator fill is achieved. It is desirable to maximize an amount of conductor within each stator slot, therefore the stator windings must be formed and placed on the stator core such that the layers nest together minimizing and gaps between layers in the stator slots. To promote the nesting of the various layers together, it is desirable to form the end turns to a precise shape, without damaging the conductor insulation during the forming process.

SUMMARY OF THE INVENTION

An apparatus and method for forming at least one end turn and at least one stator slot segment of a conductor for a stator of a dynamoelectric machine comprising a plurality of forming die sets. The forming die sets are disposed having a space substantially equal to a width of the conductor between adjacent die sets and include a female forming die and a male forming die linearly slideable to the female forming die. The die sets are disposed such that both at least one end turn and at least one stator slot segment are formable between the male forming dies and the female forming dies when the male forming dies are actuated to the female forming dies.

DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE INVENTION

Figure 1:
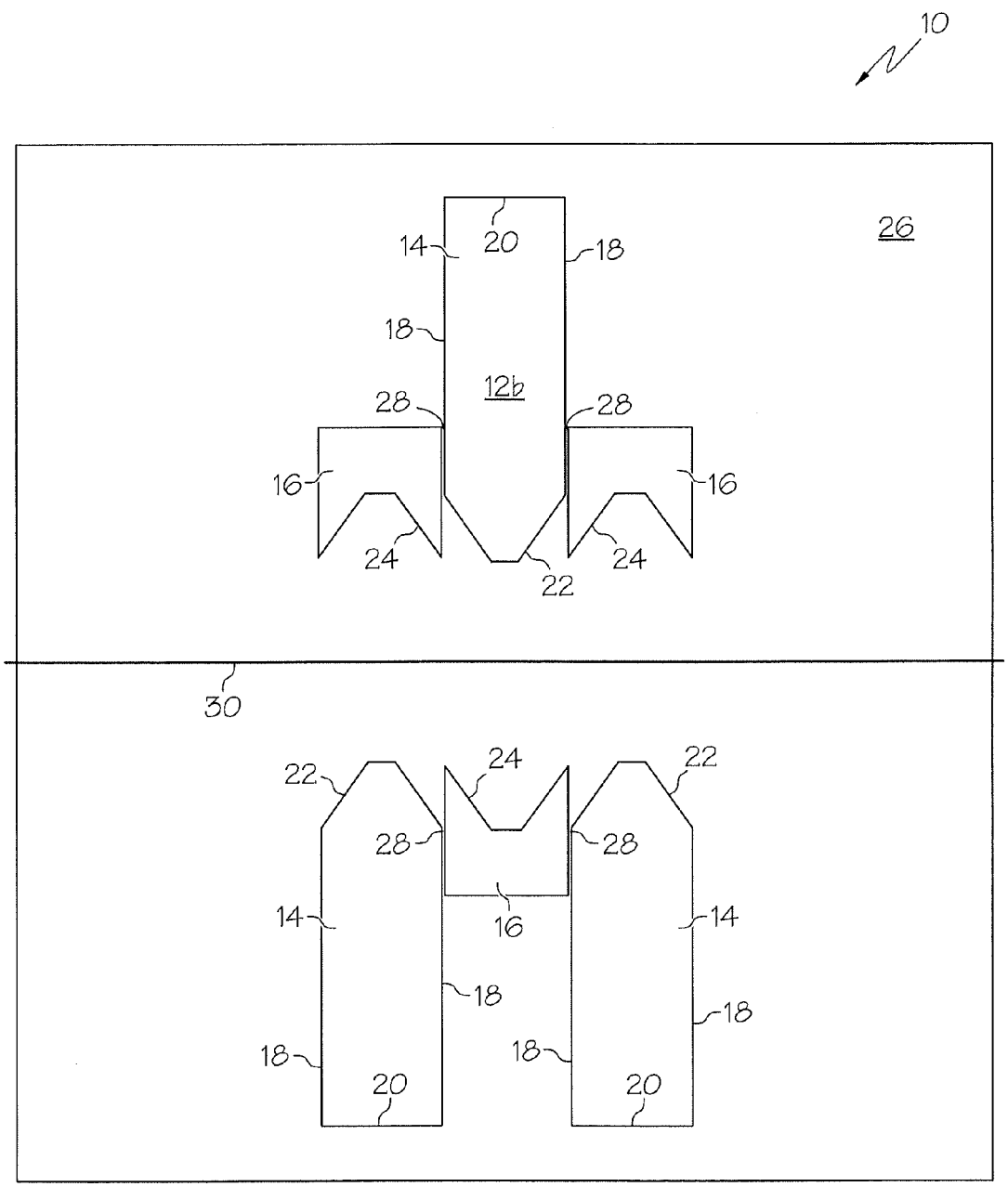
FIG. 1 is a plan view of an embodiment of a conductor forming tool.

Shown in FIG. 1 is a conductor forming tool 10 utilized to form end turns in conductors to be assembled into stator windings. The conductor forming tool 10 includes a plurality of forming die sets 12a-c. Each forming die sets 12a-c includes a male forming die 14 and a female forming die 16. Each male forming die 14 includes two lateral surfaces 18 extending from a base 20 of the male forming die 14. The lateral surfaces 18 of the male forming die 14 are substantially parallel to each other, but other configurations of lateral surfaces 18 are contemplated within the scope of the present disclosure.

An end turn surface 22 is disposed between the lateral surfaces 18, connecting one lateral surface 18 to the other lateral surface 18. The end turn surface 22 is a convex shape configured to enable a desired end turn shape to be formed utilizing the male forming die 14. In the embodiment illustrated in FIG. 1, the end turn surface 22 is gable-shaped to enable the formation of a gable-shaped end turn. Other configurations of end turn surfaces 22, for example, V-shaped or semi-circular-shaped, are also contemplated within the present scope.

Each female forming die 16 is configured to have a profile 24 which is a concave shape configured to be receptive of the end turn surface 22 of the corresponding male forming die 14, substantially matches the shape of the end turn surface 22. For example, if the end turn surface 22 is a convex gable-shape as shown in FIG. 1, the profile 24 is a concave gable shape that is receptive of the end turn surface 22.

Each male forming die 14 is paired with a female forming die 16 into forming die sets 12a-c and arranged on a plate 26 or other work surface. Each female forming die 16 is fixed in position on the plate 26 and each male forming die 14 is slidably disposed opposite to its corresponding female forming die 16 and slidable towards the female forming die 16. In one embodiment, forming die sets 12a-c are disposed in an alternating fashion, with alternating male forming dies 14 and female forming dies 16 disposed on one side of the plate 26, and their corresponding female forming dies 16 and male forming dies 14 disposed on the opposite side of the plate 26. The forming die sets 12a-c are disposed adjacent to one another such that a space 28 between forming die sets 12a and 12b is substantially equal to a width of a conductor 30 and similarly a space between die sets 12b and 12c is substantially equal to the width of the conductor 30. In the embodiment illustrated in FIG. 1, the male forming dies 14 are slidable and the female forming dies 16 are fixed, but it is to be appreciated that in some embodiments some or all of the female forming dies 16 may be slidable and some or all of the male forming dies 14 may be fixed. Additionally, it is to be appreciated that while three forming die sets 12a-c are illustrated in FIG. 1, they are shown for illustrative purposes only, and that any number of forming die sets 12a-c may be utilized in the conductor forming tool 10.

Figure 2:
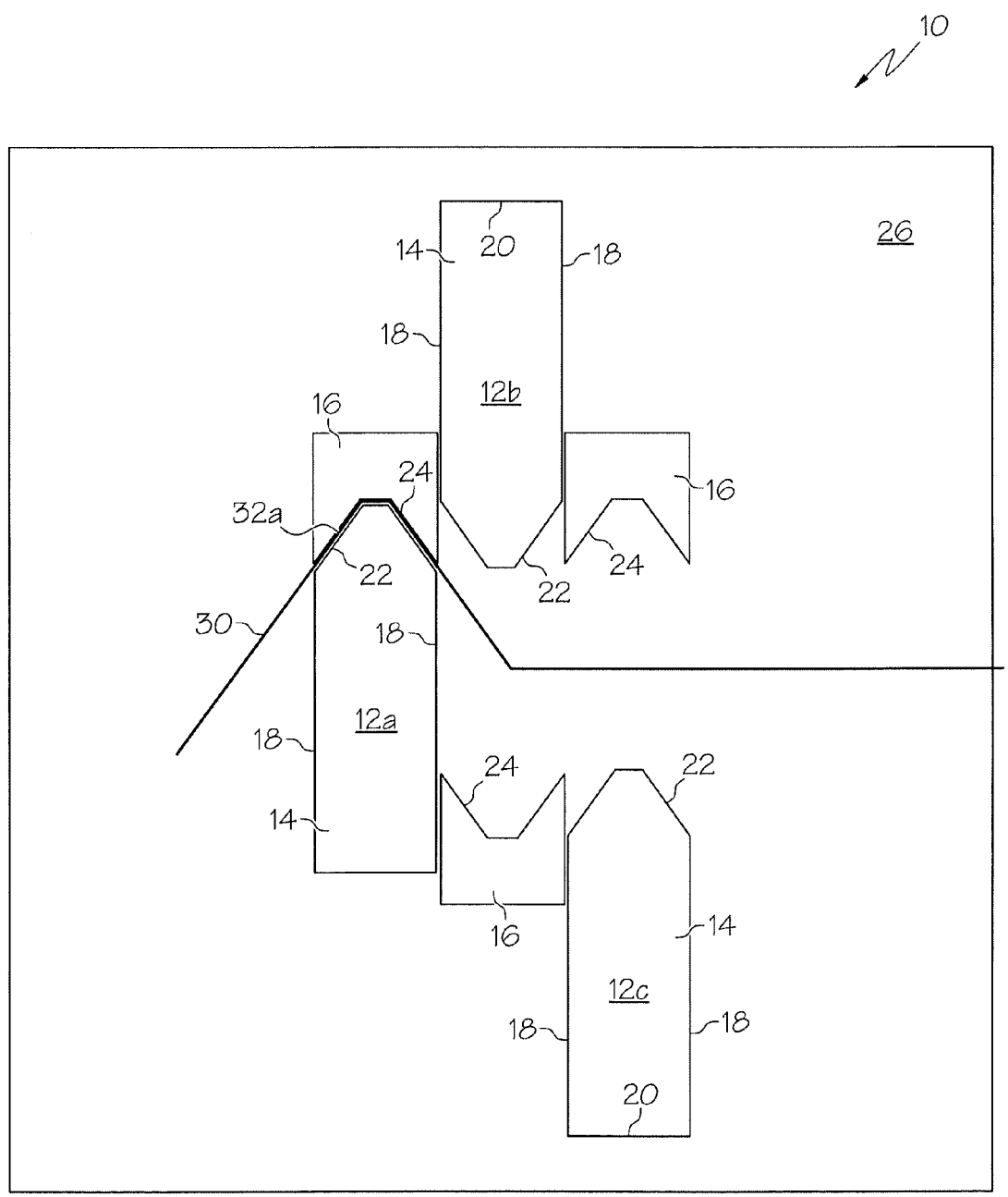
FIG. 2 is a plan view of the conductor forming tool of FIG. 1 where a first male forming die is actuated.

To form a series of end turns and stator slot sections in the conductor 30, the conductor 30, which may be pre-cut to a desired length, is placed on the plate 26 between the rows of alternating male forming dies 14 and female forming dies 16. Referring now to FIG. 2, the male forming die 14 of a first forming die set 12a is actuated and moved towards the female forming die 16 of first forming die set 12a, in a substantially linear direction. During this motion, the conductor 30 is captured between the male forming die 14 and the female forming die 16, between the end turn surface 22 and the profile 24. The male forming die 14 is moved until the conductor 30 is forced against the profile 24, forming an end turn 32a in the conductor 28.

Figure 3:
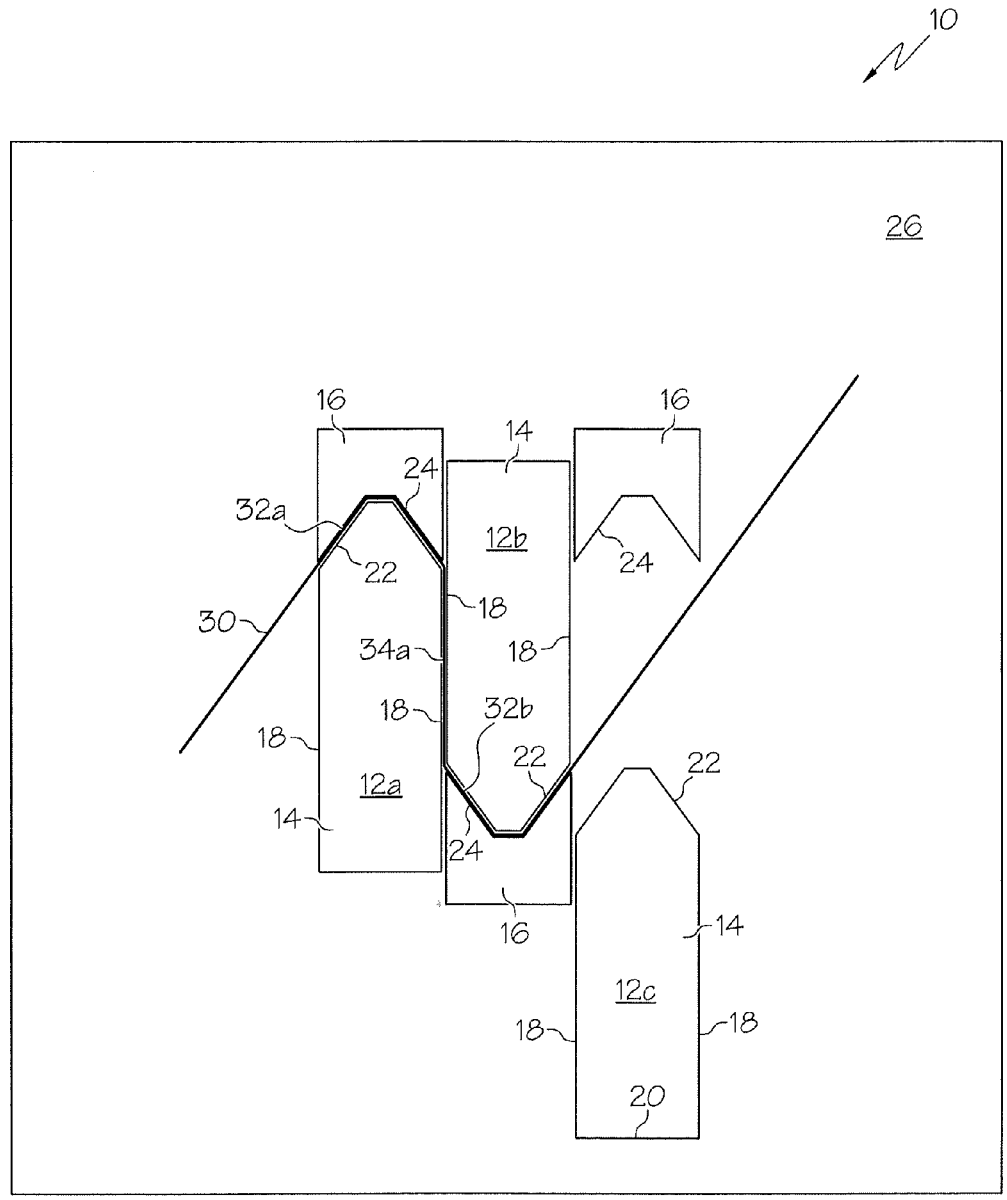
FIG. 3 is a plan view of the conductor forming tool of FIG. 1 where the first male forming die and a second male forming die are actuated.

Referring now to FIG. 3, the male forming die 14 of a second forming die set 12b, disposed adjacent to the first forming die set 12a, is actuated toward the female forming die 16 of the second forming die set 12b. A portion of the conductor 28 is captured between the adjacent lateral surfaces 18 of the first and second forming die sets 12a and 12b forming a stator slot section 34a of the conductor 30. As the male forming die 14 of the second forming die set 12b advances toward the corresponding female forming die 16, a portion of the conductor 30 is captured therebetween. The male forming die 14 advances until the conductor 30 is pushed against the profile 24 of the female forming die 16 thus forming a second end turn 32b.

Figure 4:
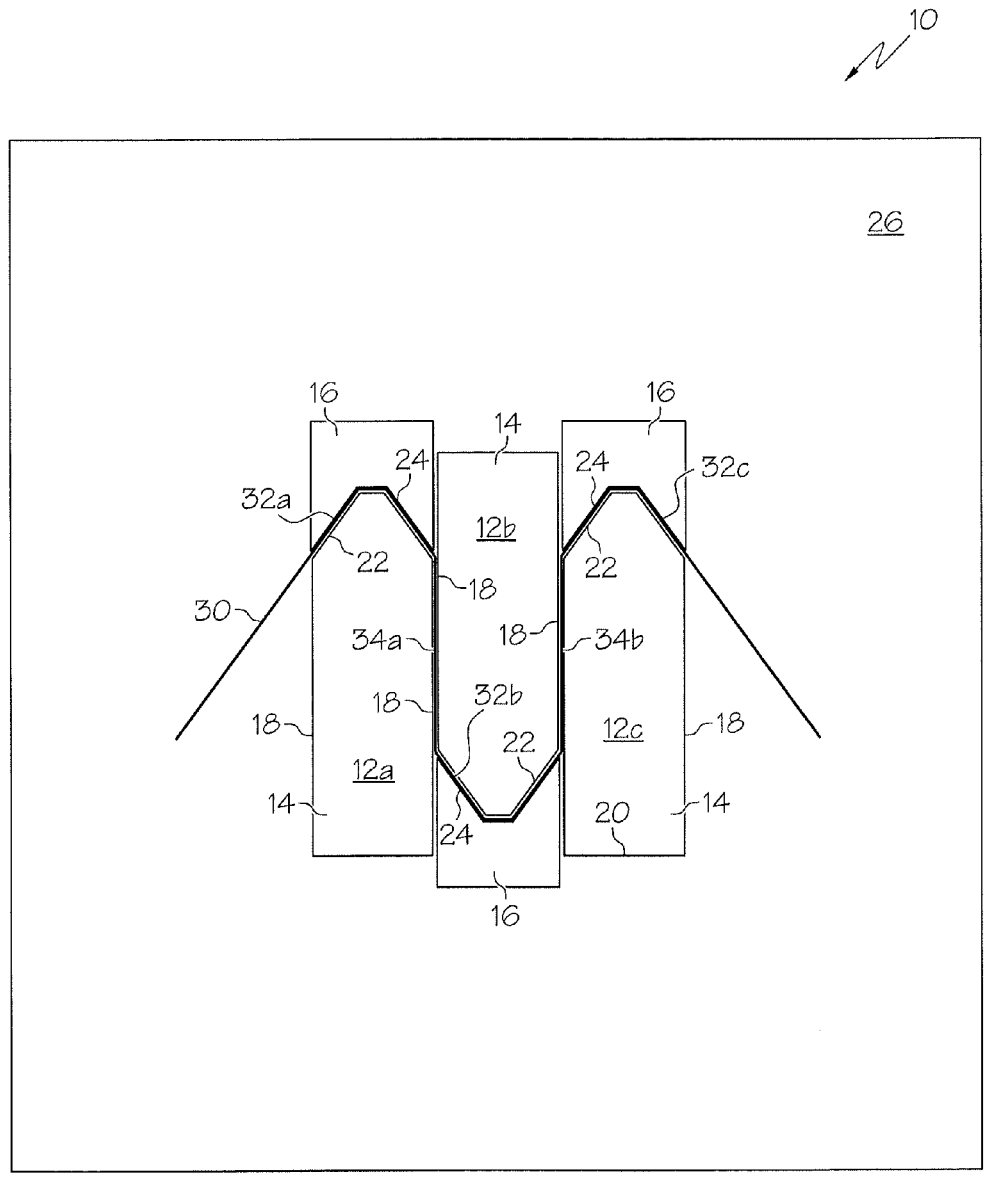
FIG. 4 is a plan view of the conductor forming tool of FIG. 1 where a third male forming die is actuated.

Similarly as shown in FIG. 4, a third forming die set 12c is actuated causing a male forming die 14 of the third forming die set 12c to advance linearly toward the corresponding female forming die 16. As the male forming die 14 advances, a portion of the conductor 30 is captured between adjacent lateral surfaces 18 of the second forming die set 12b and third forming die set 12c forming a second stator slot section 34b. The male forming die 14 forces a portion of the conductor 30 against the profile 24 of the third forming die set 12c forming a third end turn 32c.

To form additional end turns 32a, 32b, 32c and stator slot sections 34 in the conductor 30, additional forming die sets 12 may be added to the plate 24 and the forming process before the first forming die set 12a and/or after the third forming die set 12c.

Forming the end turns 32a, 32b, 32c and stator slot sections 34 using the above-described forming die sets 12a-c and process which are able to form a stator slot section 34 and end turns 32a, 32b, 32c with a single die actuation results in conductors 30 having the desired shape of end turns 32a, 32b, 32c to have the desired nesting properties when installed in a stator core.

While embodiments of the invention have been described above, it will be understood that those skilled in the art, both now and in the future, may make various improvements and enhancements which fall within the scope of the claims which follow. These claims should be construed to maintain the proper protection for the invention first described.

What is claimed is:

1. An apparatus for forming at least one end turn and at least one stator slot segment of a conductor for a stator of a dynamoelectric machine comprising a at least two forming die sets disposed having a space substantially equal to a width of the conductor between adjacent die sets, each forming die set including a female forming die and a male forming die linearly slideable to the female forming die, the die set disposed such that both at least one end turn and at least one stator slot segment are formable between the male forming dies and the female forming dies when the male forming dies are sequentially actuated to the female forming dies.

2. The apparatus of claim 1 wherein each male die includes a convex end turn surface for forming the end turn shape.

3. The apparatus of claim 1 wherein each female die includes a concave profile for forming the end turn shape.

4. The apparatus of claim 1 wherein each male die includes two lateral surfaces, the at least one stator slot segment is formed between lateral surfaces of adjacent forming die sets.

5. The apparatus of claim 1 wherein the forming die sets are disposed in an alternating arrangement such that a female forming die of a first forming die set is disposed adjacent to a male forming die of a second forming die set.

6. The apparatus of claim 1 wherein the female forming dies are fixed to a plate.

7. The apparatus of claim 1 wherein the female forming die and the male forming die are configured to form a gable-shaped end turn therebetween.

8. A method of forming at least one end turn and at least one stator slot segment in a conductor for a dynamoelectric machine comprising:

locating the conductor between a male forming die and a female forming die of each forming die set of a plurality of forming die sets, the die sets disposed with a space substantially a width of the conductor between adjacent dies sets;

sequentially actuating the male forming dies of at least one die set of the plurality of die sets toward the corresponding female forming dies of the plurality of die sets;

capturing at least a portion of the conductor between each male forming die and corresponding female forming die;

forming an end turn in the conductor between the male forming die and the female forming die; and forming a stator slot segment between adjacent forming die sets.

9. The method of claim 8 wherein the stator slot segment is formed between lateral surfaces of male forming dies of adjacent forming die sets.

10. The method of claim 8 wherein the end turn is formed between a convex end turn surface of a male forming die and a concave profile of a corresponding female forming die.

11. The method of claim 8 wherein the end turn is gable-shaped.

12. The method of claim 8 wherein each female die is fixed to a plate.

* * * * *